United States Patent [19]
Boivin et al.

[11] Patent Number: 5,860,486
[45] Date of Patent: Jan. 19, 1999

[54] REAR SUSPENSION SYSTEM FOR A LAND VEHICLE

[75] Inventors: Denis Boivin, La Pocatiere; Alain Boivin, St-Henri, both of Canada

[73] Assignee: Bombardier, Inc., Montreal, Canada

[21] Appl. No.: 632,581

[22] Filed: Apr. 15, 1996

[51] Int. Cl.[6] .................................................. B62D 55/104
[52] U.S. Cl. ........................... 180/193; 180/190; 305/127
[58] Field of Search .................................. 180/190, 193, 180/182; 305/120, 127

[56] References Cited

U.S. PATENT DOCUMENTS

| | | | |
|---|---|---|---|
| 3,913,692 | 10/1975 | Lohr et al. | 180/5 R |
| 3,944,005 | 3/1976 | Tomita | 180/193 |
| 4,314,618 | 2/1982 | Tamura | 180/193 |
| 4,407,386 | 10/1983 | Yasui et al. | 180/193 |
| 4,518,056 | 5/1985 | Kobayashi | 180/193 |
| 4,546,842 | 10/1985 | Yasui | 180/193 |
| 4,787,470 | 11/1988 | Badsey | 180/210 |
| 4,826,260 | 5/1989 | Plourde | 305/16 |
| 4,917,207 | 4/1990 | Yasui et al. | 180/193 |
| 5,033,572 | 7/1991 | Zulawski | 180/190 |
| 5,692,579 | 12/1997 | Peppel et al. | 180/190 |
| 5,730,242 | 3/1998 | Furusawa | 180/193 |

FOREIGN PATENT DOCUMENTS

| | | |
|---|---|---|
| 62-214065 | 9/1987 | Japan . |
| 3157283 | 7/1991 | Japan . |

*Primary Examiner*—Daniel G. DePumpo
*Attorney, Agent, or Firm*—Lieberman & Brandsdorfer, LLC

[57] ABSTRACT

A rear suspension system for a land vehicle comprising a single generally centrally mounted structure in a middle portion of the rear suspension system. The suspension system comprises a pair of inclined primary suspension means, and a pair of inclined primary oscillating arms for pivotally connected to a pair of laterally spaced longitudinal slides at an underside area of the chassis of the land vehicle. Each of the primary oscillating arms comprise a distal end, which are further coupled to a horizontal bar adjacent a distal end of the primary suspension means, such as a shock absorber, and a proximal end which are individually mounted a horizontal bar adjacent a front end of the primary suspension means at an underside portion of the chassis. The suspension system further comprises a Weight Transfer Dynamic Compensator for raising a front tip portion of the longitudinal slides each time there is a transfer of weight in the vehicle. The Weight Transfer Dynamic Compensator is beneficial during acceleration and cornering of the vehicle by allowing the front end of the vehicle to remain close to the ground, thereby providing improved traction and control of the vehicle.

25 Claims, 9 Drawing Sheets

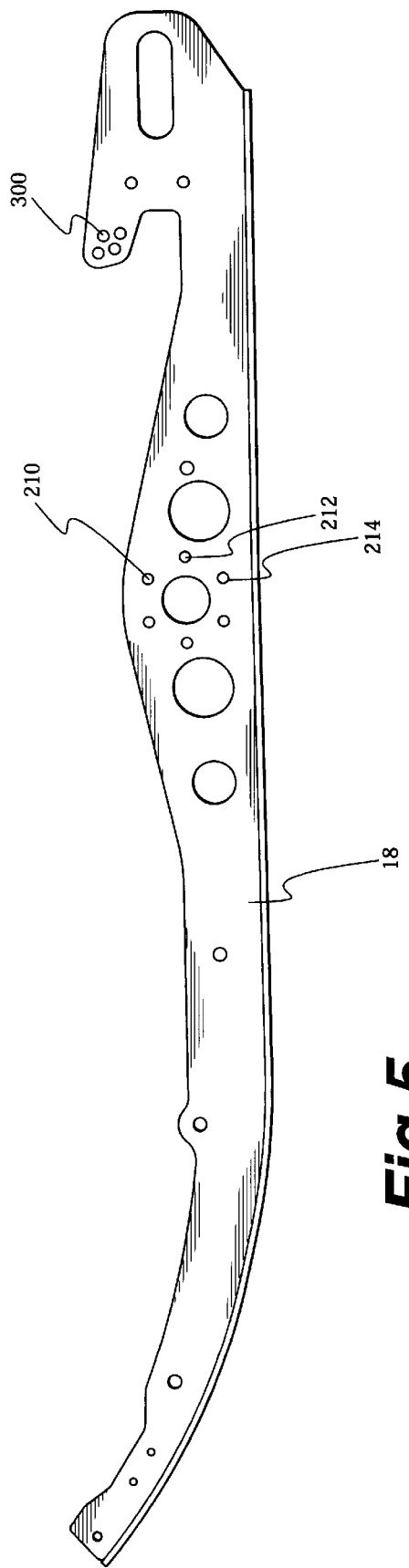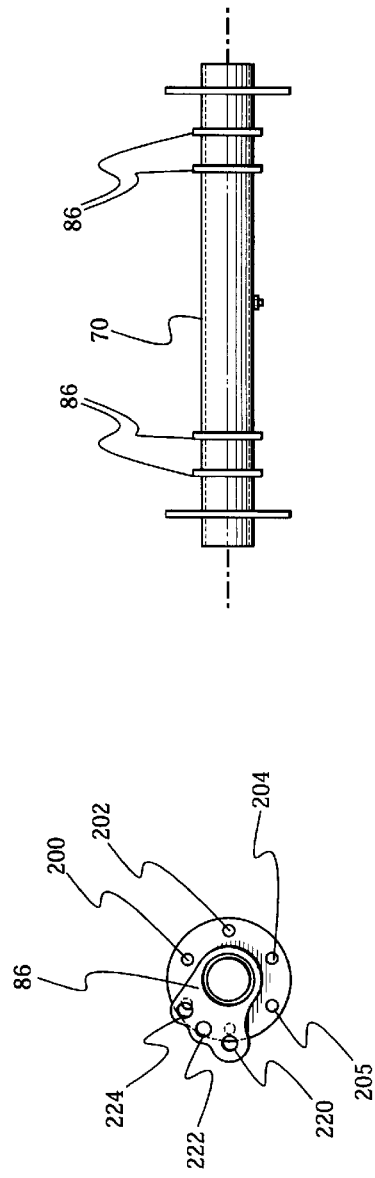
Fig. 5
Fig. 6a
Fig. 6b

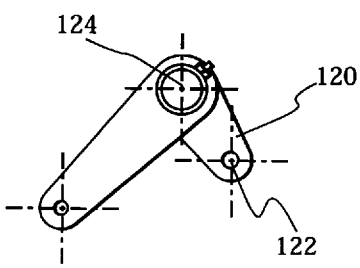
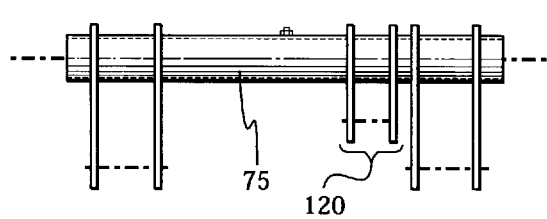
Fig.7a   Fig.7b
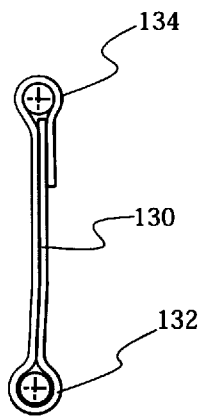
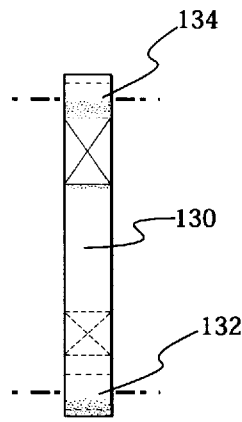
Fig.8a   Fig.8b
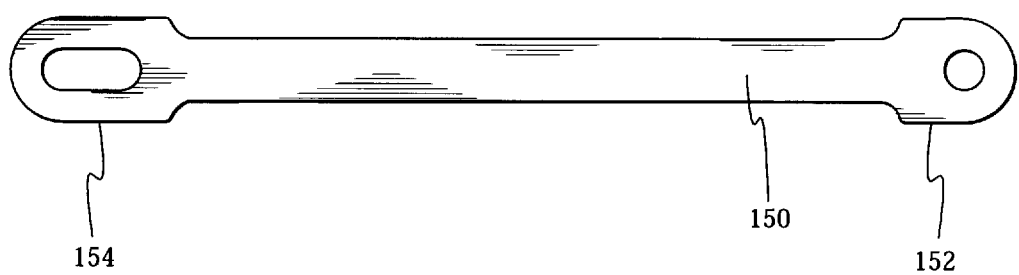
Fig.9

REAR SUSPENSION SYSTEM FOR A LAND VEHICLE

BACKGROUND OF THE INVENTION

1. Field of the Invention

This invention relates to a single generally centrally mounted structure in a rear suspension system for a land vehicle, and more particularly to a weight transfer system for providing an adjustment between alternative riding conditions.

2. Discussion of Related Art

Rear suspension systems in land vehicles conventionally comprise apparatus which are mounted to the chassis of the vehicle in a plurality of locations. Typically, the rear suspension systems are heavy due to the number of components in the system, and the impact of the energy absorbed during the ride of the vehicle is absorbed by the driver.

Several rear suspension systems for snowmobile vehicles have been patented. For example, U.S. Pat. No. 4,826,260 to Plourde discloses a suspension system for an endless track vehicle, such as a snowmobile. The suspension system comprises a shock absorber unit being pivotally connected to a forwardly located crank arm, a strap and a retainer rod. The retainer rod extends across and is fixed to a front portion of a pair of lateral slides. The strap limits the downward movement of the front portion of the lateral slides by means of coil springs and a shock absorber unit. Furthermore, the shock absorber unit exerts a downward force on both the front and rear portions of the slides.

Another example of a rear suspension system for a snowmobile vehicle is U.S. Pat. No. 4,407,386 to Yasui et al. This patent discloses a suspension unit comprising a first shock absorber in a front portion of the rear suspension system, and a second shock absorber in a rear portion of the rear suspension system. The first shock absorber is connected to a proximal end of a guiderail by means of a cross tube, which is pivotally supported to the vehicle by means of bolts. The second shock absorber is connected to a distal end of the guiderail by means of bellcranks and arms. The bellcranks are pivotally supported on an axle which is journaled in the body of the snowmobile vehicle. Furthermore, the rear portion of the rear suspension system comprises a strap for limiting the maximum vertical travel of the guiderails with respect to the body of the vehicle at such time as the vehicle is vertically lifted off the ground. Accordingly, this patent limits the vertical lift of the guiderails by means of a two sets of shock absorber units, inc combination with springs, a strap, bellcranks and arms.

Other examples of patented rear suspension systems for land vehicles and snowmobiles include: U.S. Pat. No. 5,033,572 to Zulawski, U.S. Pat. No. 4,787,470 to Badsey, U.S. Pat. No. 4,546,842 to Yasui, U.S. Pat. No. 3,913,692 to Lohr et al, Japanese document 62-214065, and Japanese document 3-157283.

While each of the above described and cited rear suspension systems for land vehicles function adequately, they each have certain drawbacks. The major drawback is that the rear suspension systems are mounted to the underside of the chassis at both a front and rear portions thereof. The dual attachment of the prior art suspension systems in some circumstances add increased weight to the vehicle, reduce travel of the suspension, and increase the drag on a returning section of an endless track thereby decreasing the maximum speed achievable.

Therefore, what is desirable in a rear suspension system for a land vehicle is a generally centrally mounted rear suspension system capable of providing improved acceleration and cornering, an increase in the maximum speed achievable, a reduction in the weight of the vehicle by reducing the number of components in the suspension system, and an improved shock system for decreasing the workload of the components of the suspension system.

SUMMARY OF THE INVENTION

It is therefore the general object of the present invention to provide a single generally centrally mounted structure in a rear suspension unit of a land vehicle, such as snowmobiles and other recreational vehicles.

Another object of the invention is to provide a rear suspension system for a land vehicle which can provide for an adjustment between alternative riding conditions during weight transfer of the vehicle, especially during acceleration and cornering.

Additionally, it is a further object of the invention is to reduce the weight of the rear suspension system by reducing the number of components therein.

Furthermore, it is a further object of the invention is to transfer the energy impact on the land vehicle toward the center of gravity of the land vehicle, thereby reducing the kick back effect, and transferring the energy impact away from the driver of the vehicle.

In accordance with the invention, these and other objectives are achieved by providing a suspension system for the rear portion of a land vehicle comprising a single mounting structure in a central portion of the suspension system, and further providing a weight dynamic compensator for allowing adjustment between alternative riding conditions.

BRIEF DESCRIPTION OF THE DRAWINGS

These and other objects, features and advantages of the invention, as well as the invention itself, will become better understood by reference to the following detailed description when considered in connection with the accompanying drawings, wherein:

FIG. 5 is a side view of a second embodiment of the travel means;

FIG. 6a is a side view of the bracket;

FIG. 6b is a front elevational view of a support holding the bracket;

FIG. 7a is a side elevational view of the secondary pivoting arm;

FIG. 7b is a front elevational view of a support and the secondary pivoting arm attachment;

FIG. 8a is a front elevational view of the pulling belt;

FIG. 8b is a right side view of the pulling belt;

FIG. 9 is a side view of the slide bar;

DETAILED DESCRIPTION OF THE PREFERRED EMBODIMENTS

Figure 1:
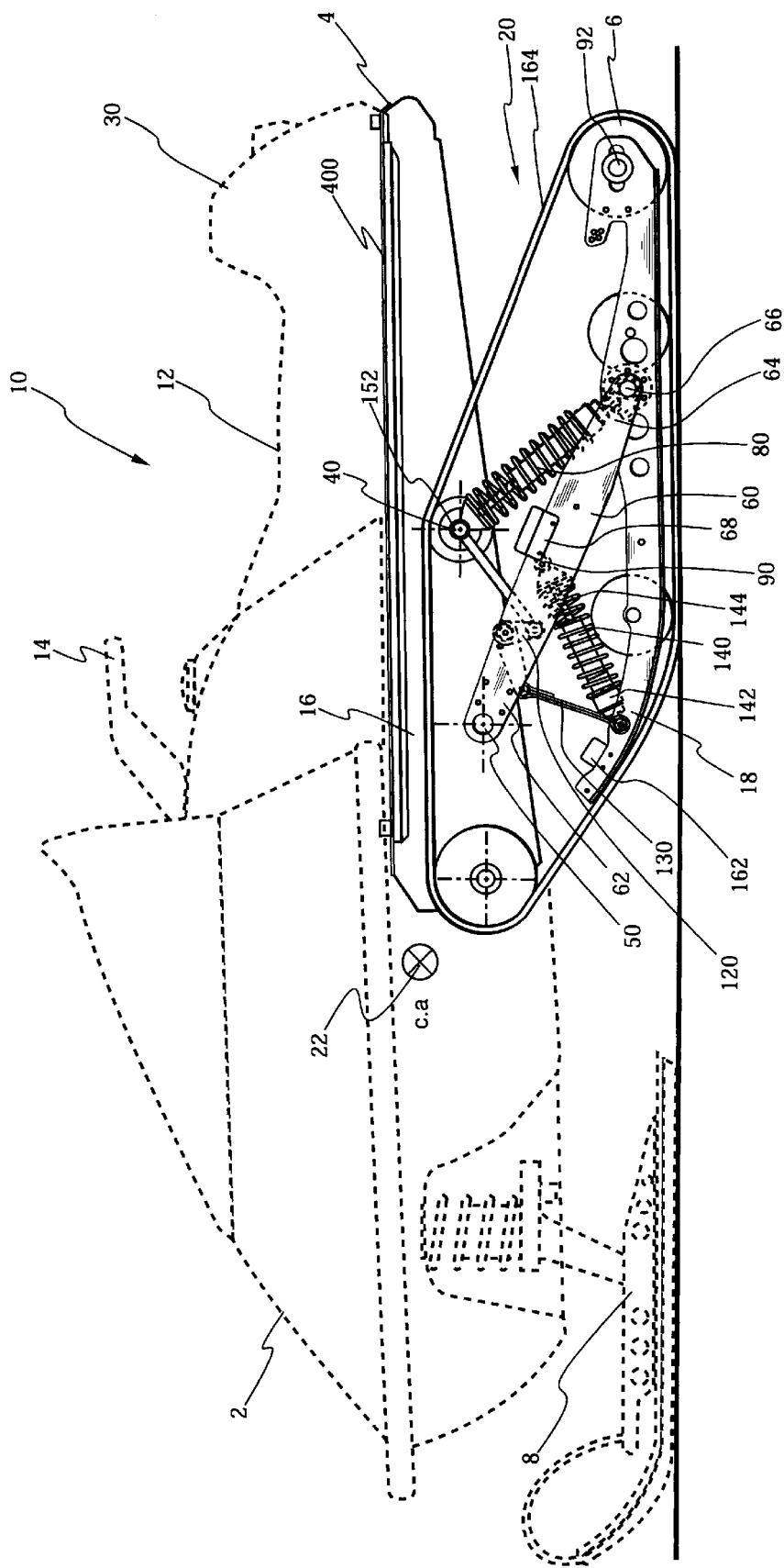
FIG. 1 is a side view of a snowmobile, including the rear suspension system according to the present invention.

Although the disclosed invention may have broad applicability, it relates primarily to a rear suspension system for a land vehicle, and more specifically to a land vehicle with a track, such as a snowmobile. The following description will indicate certain items as occurring in pairs when only one of the pairs is shown in the accompanying drawings. It is to be understood that the portion of each pair which is not shown is identical to the illustrated part and performs the same function as the illustrated item. Accordingly, it should be noted that like reference numerals are used throughout the attached drawings to designate the same or similar elements or components.

Referring now to the drawings, FIG. 1 illustrates a novel rear suspension system 20 for a snowmobile vehicle 10. The vehicle 10 has a front portion 2, with a forwardly mounted engine therein (not shown), forwardly mounted travel means 8, and a rear portion 30, comprising a seat area 12, steering means 14, a chassis 16, rearwardly mounted travel means 18 (also known as slide members), and a rear suspension system 20 (see FIG. 3). The center of gravity 22 of the vehicle is in the front portion 2 of the vehicle 10 at 22 as indicated.

The rear suspension system 20 of the vehicle is located adjacent the rear portion of the land vehicle 10, on an underside of the chassis 16 and is attached to the chassis 16 by means of two horizontal bars. A first horizontal bar 40 is attached to an underside of the chassis directly below the seat area, and a second horizontal bar 50 is attached to an underside of the chassis directly below the steering means 14.

Figure 2:
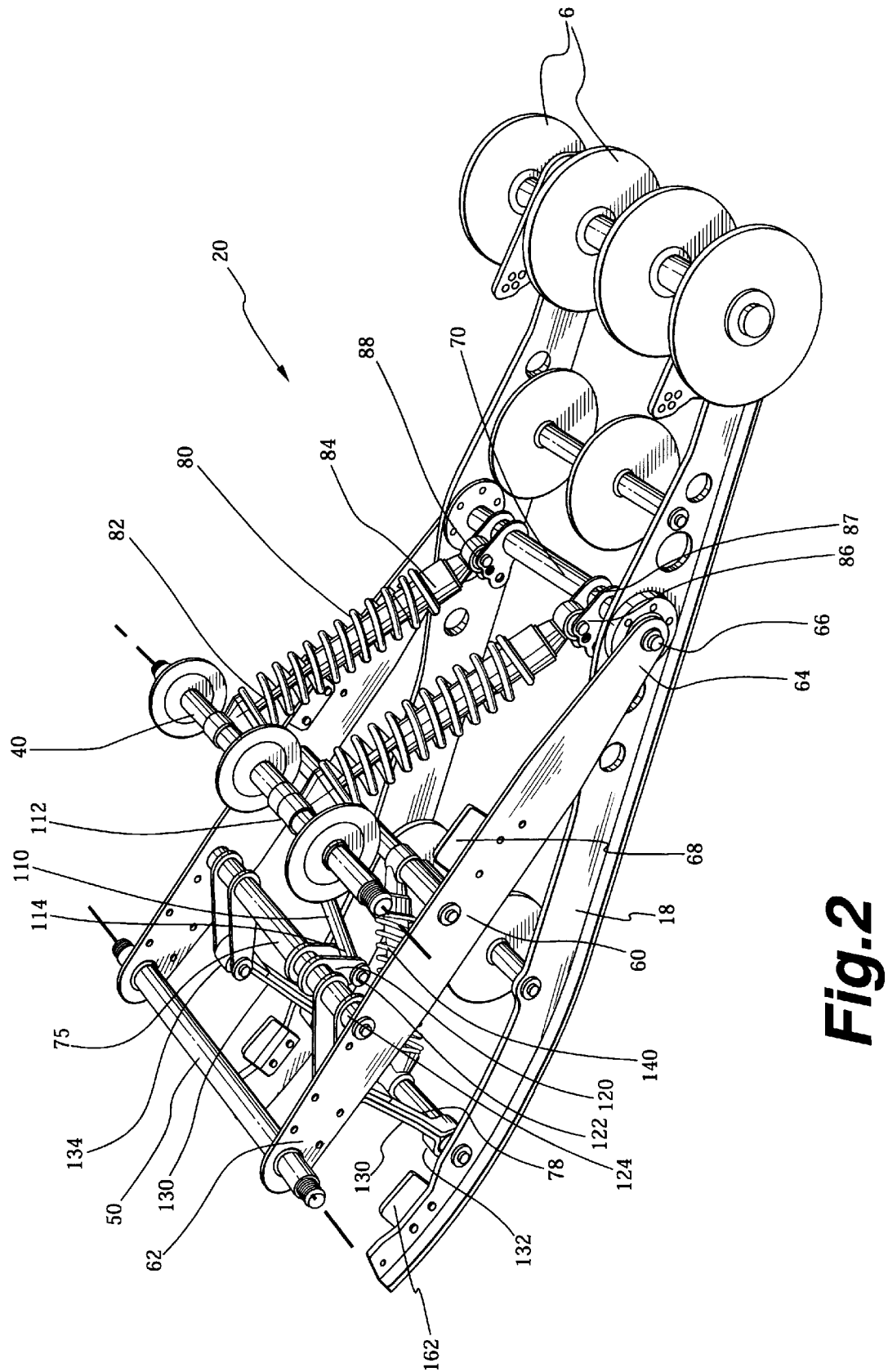
FIG. 2 is a perspective view of the rear suspension system.

In the following description, the terms 'proximal' and 'distal' are with reference to the front portion 2 of the vehicle. The rear suspension system 20, as shown in FIG. 2, comprises rearwardly mounted travel means 18 having proximal and distal portions. The suspension system 20 further comprises a pair of inclined primary pivoting arms 60, having proximal ends 62 and distal ends 64. The proximal ends to the primary pivoting arms 62 are attached to the second horizontal bar 50, and the distal portion of the primary pivoting arms 64 are connected to a third horizontal bar 70 at distal portion of the rearwardly mounted travel means 18. Accordingly, the primary pivoting arms are mounted between the second horizontal bar and the third horizontal bar such that the primary pivoting arms are inclined at an acute angle with respect to the rearwardly mounted travel means, when the vehicle is in a rest position.

The rear suspension system 20 further comprises a primary suspension means 80, having a proximal end 82 and a distal end 84. The proximal end of the primary suspension means 82 is attached to the first horizontal bar 40 at a rear portion of the underside of the chassis 16, and a distal end of the primary suspension means 84 is attached to the third horizontal bar 70 at a distal portion of the rearwardly mounted travel means 18. In a preferred embodiment, the primary suspension means, which is mounted between the first and third horizontal bars, is inclined at an acute angle with respect to the rearwardly mounted travel means when the vehicle is in a rest position. The third horizontal bar 70 also holds together the rearwardly mounted travel means. In sum the third horizontal bar 70 acts as a support for the primary pivoting arms 60 and the primary suspension means 80, thereby enabling the primary suspension system to control the displacement of the rearwardly mounted travel means 18. Furthermore, due to the structure and support of the suspension system 20 with respect to the vehicle, the stress and pressure of the primary suspension means 80 is transferred to the chassis 16 at two relatively near points. Accordingly, in a preferred embodiment, the chassis comprises a reinforcing plate 400 to reinforce the chassis, as shown in FIG. 1.

As further illustrated in FIGS. 1 and 2, the distal ends of the primary pivoting arms 64 are attached to the third horizontal bar 70 by an attachment means 66. The distal ends of the primary pivoting arms 64 have an aperture therein of approximately 0.750 inches for receiving the attachment means 66. Preferably, the attachment means 66 is a bolt for securing the primary pivoting arm 60 to the third horizontal bar 70. Each proximal end of the primary pivoting arms 62 has an aperture of approximately 1.250 inches for receiving the second horizontal bar 50 at an underside of the chassis, and for securing the primary pivoting arm thereto. Preferably, the primary pivoting arms may be comprised of a metallic material, such as aluminum. However, instead of aluminum, the primary pivoting arms may be made from another metallic material having suitable or similar quality. The configuration of the primary pivoting arms 60 allows the rearwardly mounted travel means 18 to remain generally horizontal when the rearwardly mounted travel means rises over a bump. The configuration of the primary pivoting arms also allows the rear suspension to rock backwards during inertial weight transfer caused by hard accelerations.

The distal end of the primary suspension means 80 is attached to the third horizontal bar at 70, as shown in FIG. 2. More specifically, the distal ends of the primary suspension means 84 are attached to a bracket 86 which is further secured to the third horizontal bar 70. The bracket 86 has an aperture therein, for receiving the third horizontal bar and securing the primary suspension means 80 thereto. In addition, the proximal end of the primary suspension means have an aperture having a diameter of approximately 0.875 inches for securing the primary suspension means 80 to the first horizontal bar 40. Both the proximal ends 82 and distal ends 84 of the primary suspension means are attached to the first and third horizontal bars, 40 and 70 respectively, at an interior portion of the suspension system. Preferably, the primary suspension means 80 are shock absorbers designed to withstand the weight and suspension of the vehicle.

FIG. 6a clearly illustrates a side view of the bracket 86 comprising a plurality of angularly spaced-apart apertures 220, 222 and 224, arranged circumferentially around the third horizontal bar's aperture. The apertures are adapted to receive securing means, such as nuts and bolts, for locking the bracket 86 into a specific position. The bracket 86 can further be rotated about the axis of the third horizontal bar 70, thereby altering the angle of inclination of the primary suspension means and securing the primary suspension means into a specified inclination.

Figure 10:
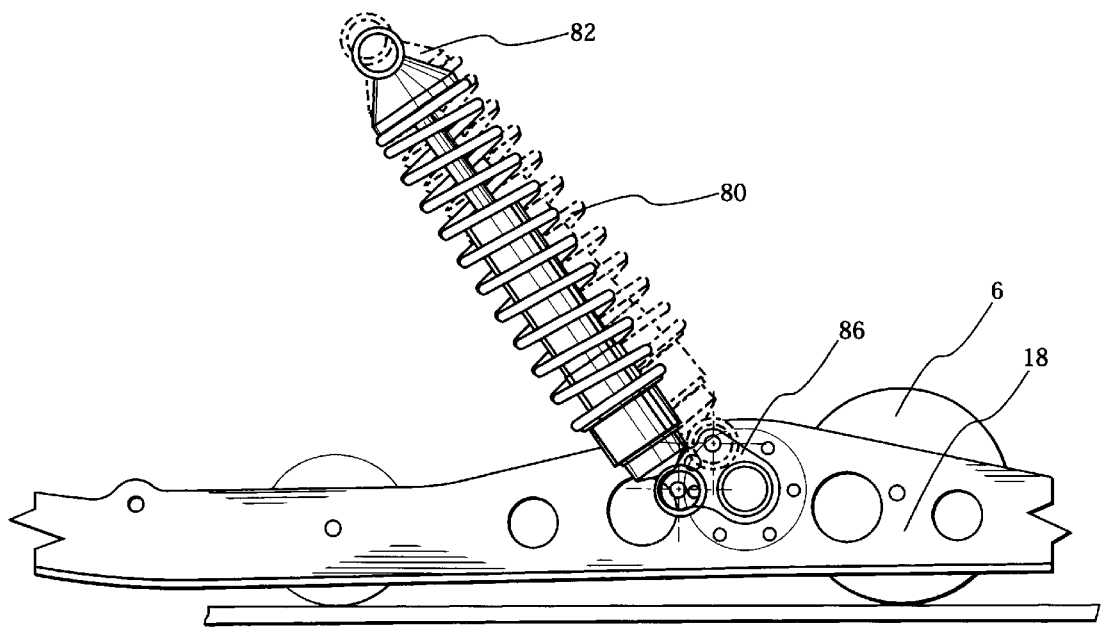
FIG. 10 is a side elevational view of the rear suspension system in accordance with the present invention showing possible adjustments to the bracket.

As illustrated in FIGS. 2 and 6a, the distal end of the bracket 86 is adjacent to a distal portion of the travel means 18, which further comprise a plurality of apertures 220, 222 and 224. Rotation of the bracket 86 further requires adjustment and securing of the travel means 18 and the corresponding apertures 220, 222 and 224. The primary suspension means 80 may be angularly positioned by attaching the distal end 84 of the primary suspension means to one of the apertures 220, 222 and 224. By positioning the primary suspension means 80, the falling rate of the primary suspension means is altered, as shown in FIG. 10.

In a further embodiment, the rear suspension system 20 comprises a Weight Transfer Dynamic Compensator (WTDC) for maintaining the front end of the vehicle in close proximity to the ground surface, thereby providing an improved traction for the entire vehicle. The features of the WTDC are clearly illustrated in FIG. 2. The WTDC in combination with the primary pivoting arms 60 and the primary suspension means 80 provides improved acceleration of the vehicle while increasing travel of the rear suspension system 20. More specifically, the WTDC comprises a rod 110, a secondary pivoting arm 120, and a pair of pulling belts 130, for providing further adjustment of the primary suspension means 80 between alternative riding conditions. The rod 110 comprises a first end 112 and a second end 114. The first end of the rod 112 is attached to the first horizontal bar 40. The first end of the rod 114 further comprises an aperture therein for receiving the first horizontal bar therein. The second end of the rod 114 is attached to the secondary pivoting arm 120 by means of a bolt. The secondary pivoting arm 120 further comprises a first end 124 which is attached to a fourth horizontal bar 75. The proximal end of the secondary oscillating arm 124 comprises an aperture therein for receiving the fourth horizontal bar 75 and is secured thereto at a central area of the fourth horizontal bar 75. Finally, the WTDC comprises a pair of pulling belts 130, one on each lateral side of the suspension system. The pulling belts comprises lower ends 132 and upper ends 134. The lower ends of the pulling belts 132 are attached to the rearwardly mounted travel means 18 at a front portion thereof by means of a fifth horizontal bar 78, as shown in FIG. 2, and the upper ends of the pulling belts 134 are attached to the fourth horizontal bar 75 by an attachment means. The upper ends of the pulling belts are attached to the fourth horizontal bar at an interior portion thereof and adjacent the primary pivoting arms 60. The pulling belts function to connect the suspension system 20 with the front portion of the rear travel means, and insures that the front portion of the rear travel means remains in close proximity to the suspension system 20. Accordingly, the pulling belts of the WTDC system pulls down a front portion of the chassis while maintaining the rearwardly mounted travel means 18 to remain in contact with the ground whenever there is a rearward transfer of weight, notably during rapid forward acceleration.

Figure 11:
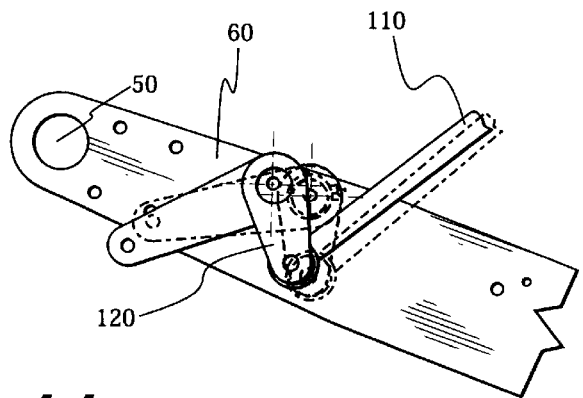
FIG. 11 is a side elevational view partially showing the Weight Transfer Dynamic Compensator (WTDC)

Alternatively, the suspension comprises a single pulling belt 130 and an auxiliary limiting strap which would prevent components of the suspension from colliding with the endless track in the unlikely event that the pulling belt 130 were to break. The combination of the generally centrally mounted suspension system and the WTDC allows for improved traction of the vehicle. FIG. 11 further illustrates the WTDC in combination with the generally centrally mounted suspension system. More specifically, FIG. 11 is illustrative of the primary elements of the WTDC secured in two different positions for different riding conditions. The solid lines represent the positioning of the rod and the secondary pivoting arm in a standard position for comfortable recreational touring while the shadow lines represent the position of the rod and the secondary pivoting arm in a more aggressive, racing position wherein the suspension compensates for greater weight transfer by allowing greater travel in the mechanism.

The rear suspension system 20 further comprises a secondary suspension means 140, having a proximal end 142 and a distal end 144 as illustrated in FIG. 1. The proximal end of the secondary suspension means 142 is attached to a fifth horizontal bar 78, and the distal end of the secondary suspension means 144 having an aperture therein for receiving a sixth horizontal bar 90 and being attached thereto. The secondary suspension means 140 of the rear suspension system 20 may be a shock absorber. The secondary suspension means 140 work to absorb shocks during movement or vertical weight transfer of the vehicle.

Figure 3:
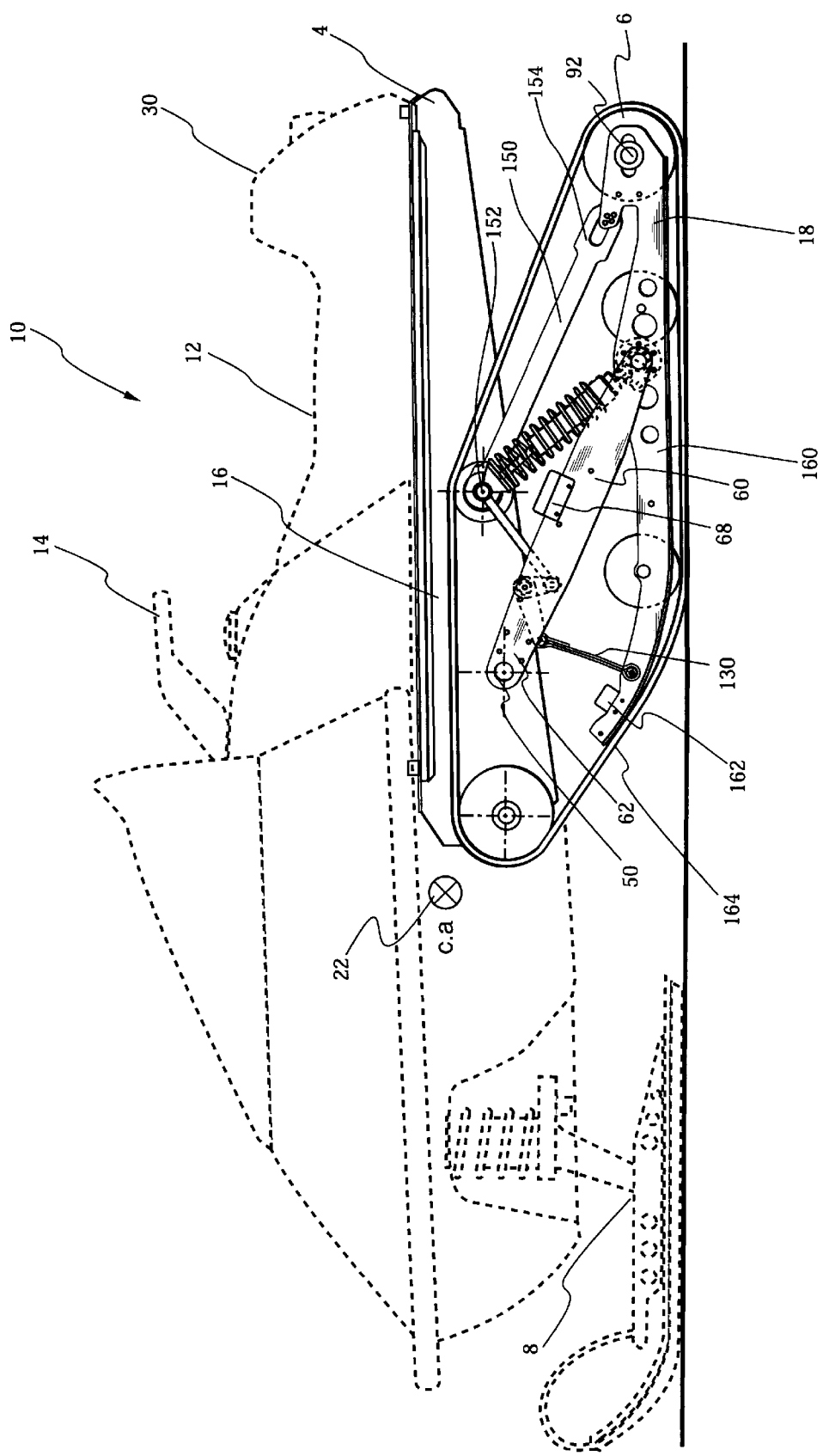
FIG. 3 is a side view of a snowmobile vehicle, including a rear suspension system and a longitudinal slide bar, according to the present invention.
Figure 12:
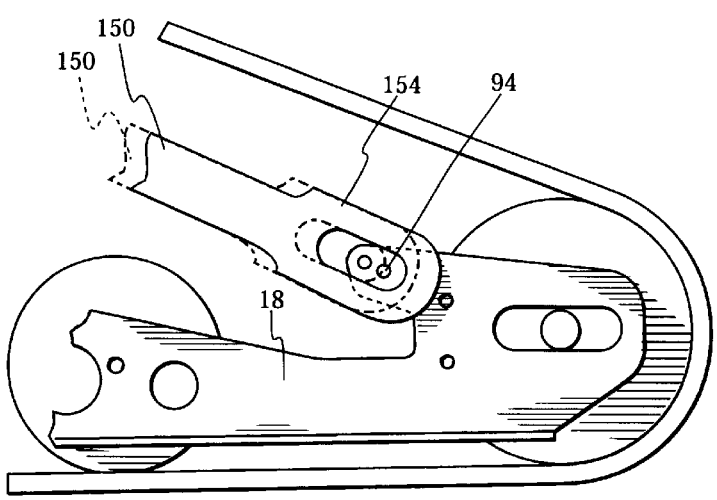
FIG. 12 is a side elevational view of the slide bar.
Figure 13:
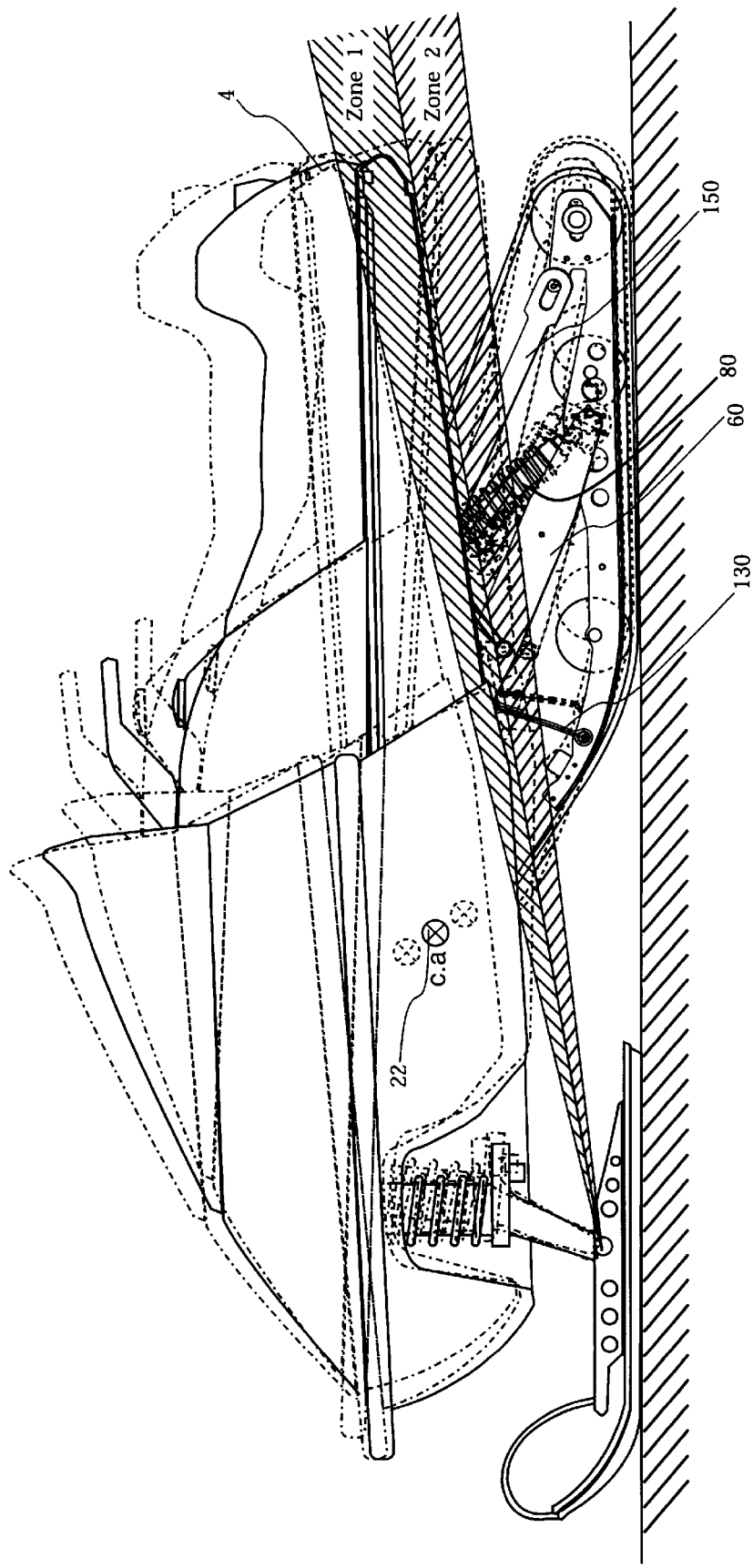
FIG. 13 is a side view of a snowmobile showing different comfort zones, according to the present invention.

In an alternative embodiment, the suspension system comprises a longitudinal slide bar 150 located at a rear portion of said vehicle, with the secondary suspension means 140 at a proximal portion of the vehicle being removed as illustrated in FIG. 3. The longitudinal slide bar 150 further comprises a proximal end 152 and a distal end 154. The proximal end of the slide bar 152 has an aperture therein, having a diameter of approximately 0.875 inches for receiving the first horizontal bar 40 and securing the slide bar 150 thereto. The distal end of the slide bar 154 has an elongated aperture therein, having a width of approximately 1.375 inches and a radius of curvature of approximately 1.000 inches, for receiving an eighth horizontal slide bar 94 adjacent a set of rear wheels of said vehicle at 300 in FIG. 5. In a preferred embodiment, the slide bar has a length of 24.50 inches, a width at a midsection of 1.50 inches, and a depth of 0.375 inches. As shown in FIGS. 3 and 5, when the rear suspension system 20 comprises the slide bar 150, the rearwardly mounted travel means 18, such as a pair of longitudinal slides 160, comprise a plurality of apertures at 300 for attaching the slide bar 150 to the rearwardly mounted travel means 18. FIGS. 12 and 13 further illustrate the attachment of the slide bar 150 to the travel means. The aperture at the distal end of the slide bar may be secured without a gap (i.e. for a tight fit) between the aperture at the distal end of the slide bar 154 and the attachment to the longitudinal slide 160 at 300, as shown in FIG. 12. In this arrangement, the slide bar cannot translate longitudinally. Such a configuration provides for a stiffer riding of the slide bar and the vehicle, as shown in zone 1 of FIG. 13. Alternatively, the aperture at the distal end of the slide bar 150 may be secured with a gap (i.e. in a sliding fit) of 0.250 inches between the aperture at the distal end of the slide bar 154 and the attachment to the slide at 300, as shown in FIG. 12. In this arrangement, the slide bar can translate longitudinally within the elongated aperture. Such a configuration provides for a softer riding of the slide bar and the vehicle, as shown in zone 2 of FIG. 12. The longitudinal slide bar 150 functions in a tension mode only, and extends from the eighth horizontal bar 94 to the first horizontal bar 40. The eighth horizontal bar 94 comprises eccentric bolts for rotating the eighth horizontal bar and thus adjusting the stiffness of the suspension system 20. The slide bar 150 is held in tension, and maintains a constant distance from the rear wheels 6 to the first horizontal bar 40, thereby transferring the force of an impact on the suspension system to the primary suspension means 80. In a preferred embodiment, the longitudinal slide bar 150 may be comprised of a thermoplastic type material. However, instead of a thermoplastic material, the slide bar 150 may be made from another material having suitable or similar quality and strength, provided that the material of the slide bar 150 enables it to accommodate the force of the suspension system in a tension mode.

Figure 3A:
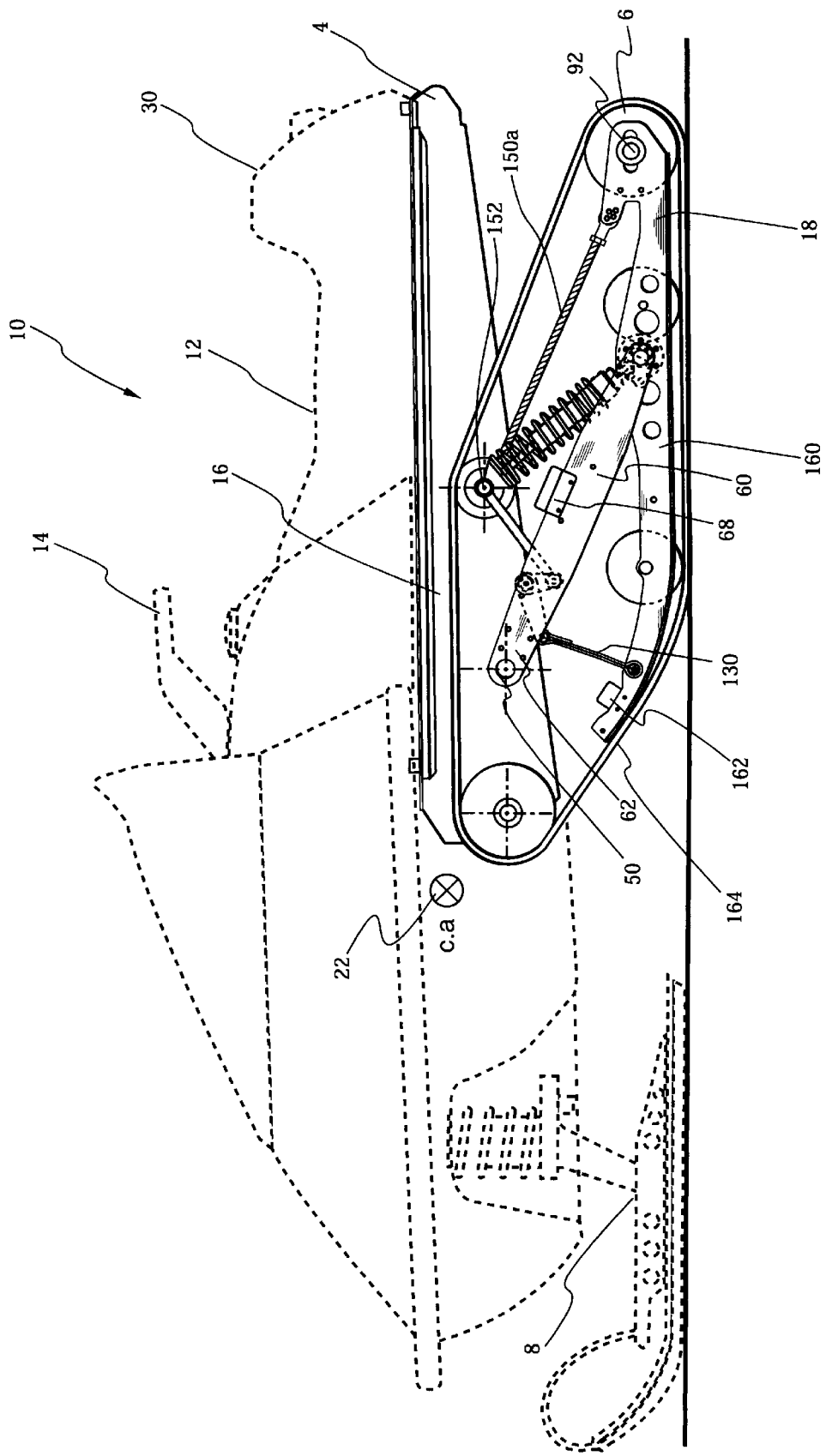
FIG. 3A is a side view of a snowmobile vehicle, including a rear suspension system and a cable, according to the present invention.

In an alternative embodiment, the slide bar 150 may be replaced by a cable 150*a* or a strap (as illustrated in FIG. 3A)

comprised of a material having suitable or similar strength as that provided by the slide bar 150.

The forwardly and rearwardly mounted travel means are shown in the attached drawings as a pair of longitudinal slides 160. In a preferred embodiment, the longitudinal slides 160 comprise a stopper 162 at a proximal end of the slide. The stopper 162 is preferably comprised of a rubber material and is located on a top surface of the slide adjacent the proximal end, so as to prevent the proximal portion of the slide from damaging the chassis and the suspension system during full extension of the primary pivoting arms 60 and the primary suspension means 80. In addition, the primary pivoting arms 60 comprise a stopper 68 at a midsection and on a top surface of the primary pivoting arms. The stopper 68 is preferably comprised of a rubber material, so as to prevent the primary pivoting arms from damaging the chassis and the suspension system during full extension of the primary pivoting arms and the suspension system 20. Accordingly, stopper 162 and stopper 68 may be made from another material having suitable or similar quality and strength to a rubber type material.

FIGS. 1, 2, and 3 illustrate in detail a preferred embodiment wherein the forwardly and rearwardly mounted travel means 18 are in the form of longitudinal slides 160 of a snowmobile. The travel means further comprise a flexible endless track 164, for supporting the chassis, and a plurality of wheels displaced along the length of the travel means for enabling the endless track to move. The longitudinal slides 160 are placed on an inside surface of the endless track and support the rear suspension system 20. In a preferred embodiment, the longitudinal slides may be comprised of a metallic type material, such as aluminum. However, instead of aluminum, the longitudinal slides 160 may be made from another metallic material having suitable or similar quality and strength. The longitudinal slides 160 preferably comprises a thickness of approximately 0.375 inches. An underside portion of the longitudinal slide, which is in direct contact with the endless track 164 of the suspension system, preferably has a width of approximately 1.000 inches and a depth of approximately 0.187 inches. The underside portion of the slide is also comprised of a metallic material, and preferably of an aluminum type material. However, instead of aluminum, the underside portion of the slide 160 may be comprised from another material having a suitable or similar quality and strength. The slide further comprises a plurality of apertures disposed throughout the length of the slide for receiving a plurality of horizontal bars for attaching the longitudinal slides 160 to rear suspension system 20 of the vehicle 10.

Figure 4:
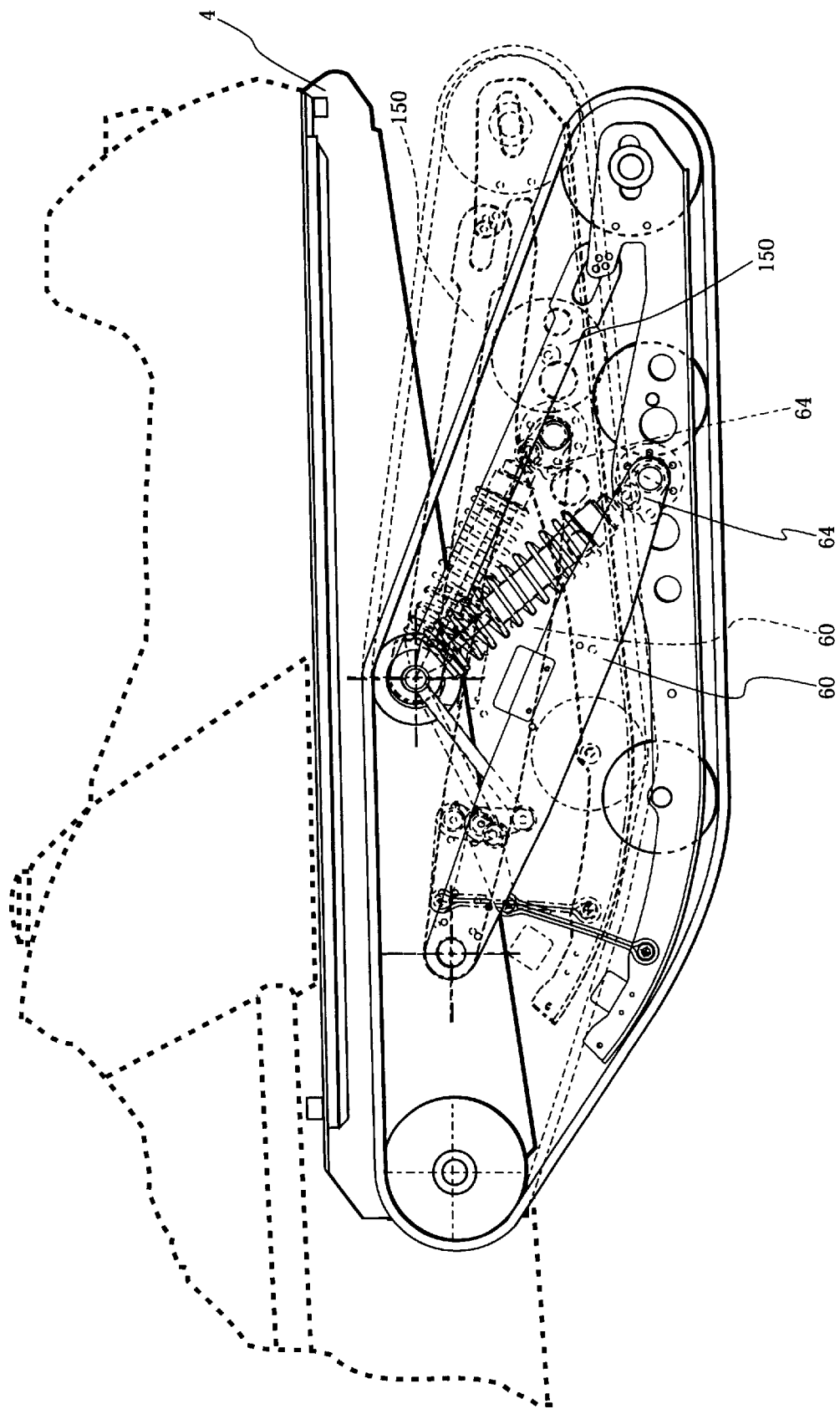
FIG. 4 is a side view of a snow mobile, displaying the displacement of the pivoting arms, according to the present invention.

As shown in FIG. 4, the centrally mounted primary pivoting arms 60 of the rear suspension system provides for improved maneuverability of the rear suspension when compared to the prior art. In a preferred embodiment, the primary pivoting arms 60 are comprised of a metallic type material, and preferably of an aluminum material. However, instead of aluminum, the primary pivoting arms 60 may be made from another material having suitable or similar quality. The arrangement of the primary pivoting arms permit the rearwardly mounted travel means to rise vertically and generally horizontally when bumps are encountered. The primary pivoting arms 60 have a length of approximately 27.00 inches, a maximum width of 3.50 inches, and a depth of 0.25 inches. At a proximal end of the pivoting arms 62, there is an aperture having a radius of 1.250 inches for receiving a second horizontal bar 50 and securing the primary pivoting arm 60 to the chassis of the vehicle. A distal end of the primary pivoting arm 64 comprises an aperture having a diameter of approximately 1.50 inches for receiving the third horizontal bar 70 and securing the distal end of the primary oscillating arms 64 thereto.

FIG. 4 shows the primary pivoting arms 60 in several different positions for a given snowmobile vehicle, wherein each position depicted is dependent upon the weight being applied to the suspension system 20. When the suspension system is at rest, the vertical distance between a top surface of the rear bumper 4 of the vehicle and the distal end of the primary pivoting arms 64 is 19.892 inches. However, when the suspension system is active and at its maximum flexibility, the primary pivoting arms are in a relatively horizontal position allowing for a vertical clearance of at least 11.500 inches from the ground to the top surface of the rear bumper 4 of the vehicle. As is further illustrated in shadow lines in FIG. 4, track tension creates a compression of the rearward portion of the suspension system. The pulling belts are able to pull down a front portion of the chassis so that the rearwardly mounted travel means remain generally horizontal and remain in contact with the ground thereby maintaining good traction.

For purposes of completeness, the following is a chart of the angle of displacement of the primary pivoting arms 60, and the vertical distance from the distal end of the primary pivoting arms 60 to a top horizontal surface of the rear bumper 4 of the particular land vehicle given in this example:

| Angle of Displacement (degrees) | Clearance (inches) |
| --- | --- |
| 18.92 | 8.392 |
| 26.52 | 12.219 |
| 34.43 | 16.784 |

When the suspension system 20 is in full extension, the minimum angle of displacement from the distal end of the primary pivoting arm is 18.92 degrees, and when the suspension system is at rest, the maximum angle of displacement from the distal end of the primary pivoting arm is 34.43 degrees.

The above description is of a generally centrally mounted rear suspension system for a land vehicle, such as a snowmobile. In an alternative embodiment, the suspension system may be in the form of a kit separate from the vehicle as a whole. The kit may be assembled and attached to a conventional snowmobile and used to modify an already existing suspension system.

Although the present invention has been described in connection with preferred embodiments thereof, it will be appreciated by those skilled in the art that additions, deletions, modifications, and substitutions not specifically described may be made without departing from the spirit and scope of the invention as defined in the appended claims and the scope should not be limited to the dimensions indicated hereinabove.

What is claimed:

1. A suspension assembly for a snowmobile vehicle comprising:

two substantially parallel and spaced apart elongated slide members defining a longitudinal axis, connected together with transversally mounted bridge members, each said slide member having a first curved ending portion and a second ending portion for connection of ending wheels, two substantially parallel elongated pivoting arms, each having a first end pivotally connected on said slide members at a first connection point spaced apart said first ending portion and a second end adapted for connection to a vehicle chassis; a first transversal rod, adapted for connection to the vehicle chassis, resiliently connected to said slide members and pivotally connected to said pivoting arms through a fourth transversal rod disposed between the pivoting arms between said second end and said first end; said fourth rod being pivotally connected to the curved portion of the slide members through a fifth horizontal rod disposed between said curved portions of said slide members.

2. A suspension assembly as defined in claim 1, wherein said first transversal rod, is resiliently connected to said slide members at said first connection point.

3. A suspension assembly as defined in claim 1, wherein said first transversal rod is resiliently connected to said slide members through a third transversal rod.

4. A suspension assembly as defined in claim 1, wherein said first transversal rod is resiliently connected to said slide members with at least one resilient member.

5. A suspension assembly as defined in claim 4, wherein said resilient member is a shock absorber.

6. A suspension assembly as defined in claim 1, wherein the connection between said first transversal rod and said fourth transversal rod is provided with a two-part linking member.

7. A suspension assembly as defined in claim 1, wherein the connection between the fourth rod and the fifth horizontal rod is provided with a strap.

8. A suspension assembly for a snowmobile vehicle comprising:

two substantially parallel and spaced apart elongated slide members defining a longitudinal axis, connected together with transversally mounted bridge members, each said slide member having a first curved ending portion and a second ending portion for connection of ending wheels;

two substantially parallel elongated pivoting arms, each having a first end pivotally connected on said slide members at a first connection point spaced apart said first ending portion and a second end adapted for connection to a vehicle chassis;

a first transversal rod, adapted for connection to the vehicle chassis, resiliently connected to said slide members and pivotally connected to said pivoting arms through a fourth transversal rod disposed between the pivoting arms between said second end and said first end; said fourth rod being pivotally connected to the curved portion of the slide members through a fifth horizontal rod disposed between said curved portions of said slide members, said pivoting arms being resiliently connected to said curved portion of said slide members.

9. A suspension assembly as defined in claim 8, wherein said pivoting arms are resiliently connected to said curved portion of said slide members with at least one resilient member.

10. A suspension assembly as defined in claim 9, wherein said resilient member is a shock absorber.

11. A suspension assembly as defined in claim 8, wherein said first transversal rod, is resiliently connected to said slide members at said first connection point.

12. A suspension assembly as defined in claim 8, wherein said first transversal rod is resiliently connected to said slide members through a third transversal rod.

13. A suspension assembly as defined in claim 8, wherein said first transversal rod is resiliently connected to said slide members with at least one resilient member.

14. A suspension assembly as defined in claim 13, wherein said resilient member is a shock absorber.

15. A suspension assembly as defined in claim 8, wherein the connection between said first transversal rod and said fourth transversal rod is provided with a two-part linking member.

16. A suspension assembly as defined in claim 8, wherein the connection between the fourth rod and the fifth horizontal rod is provided with a strap.

17. A suspension assembly for a snowmobile vehicle comprising:

two substantially parallel and spaced apart elongated slide members defining a longitudinal axis, connected together with transversally mounted bridge members, each said slide member having a first curved ending portion and a second ending portion for connection of ending wheels;

two substantially parallel elongated pivoting arms, each having a first end pivotally connected on said slide members at a first connection point spaced apart said first ending portion and a second end adapted for connection to a vehicle chassis;

a first transversal rod, adapted for connection to the vehicle chassis, resiliently connected to said slide members and pivotally connected to said pivoting arms through a fourth transversal rod disposed between the pivoting arms between said second end and said first end; said fourth rod being pivotally connected to the curved portion of the slide members through a fifth horizontal rod disposed between said curved portions of said slide members, said first transversal rod being connected to at least one of said second ending portion of said slide members.

18. A suspension assembly as defined in claim 17, wherein said first transversal rod being connected to at least one of said second ending portion of said slide members with a sliding type connection.

19. A suspension assembly as defined in claim 17, wherein said connection is provided with an elongated slide bar connected on a first end to said first rod and on a second end to said slide member.

20. A suspension assembly as defined in claim 17, wherein said first transversal rod, is resiliently connected to said slide members at said first connection point.

21. A suspension assembly as defined in claim 17, wherein said first transversal rod is resiliently connected to said slide members through a third transversal rod.

22. A suspension assembly as defined in claim 17, wherein said first transversal rod is resiliently connected to said slide members with at least one resilient member.

23. A suspension assembly as defined in claim 22, wherein said resilient member is a shock absorber.

24. A suspension assembly as defined in claim 17, wherein the connection between said first transversal rod and said fourth transversal rod is provided with a two-part linking member.

25. A suspension assembly as defined in claim 17, wherein the connection between the fourth rod and the fifth horizontal rod is provided with a strap.

* * * * *